United States Patent [19]

Moini

[11] Patent Number: 5,225,074
[45] Date of Patent: Jul. 6, 1993

[54] AUTOMATIC SWIMMING POOL CHLORINATOR

[75] Inventor: Siamak Moini, Encino, Calif.
[73] Assignee: Philip L. Leslie, Tarzana, Calif.
[21] Appl. No.: 936,294
[22] Filed: Aug. 28, 1992
[51] Int. Cl.$^5$ ............................................. B01D 11/00
[52] U.S. Cl. ............................... 210/169; 210/198.1; 210/206; 210/242.1; 422/264; 422/278; 422/281; 15/1.7
[58] Field of Search ............ 210/169, 198.1, 199, 210/205, 206, 242.1; 422/264, 278, 281; 15/1.7

[56] References Cited

U.S. PATENT DOCUMENTS

| | | | |
|---|---|---|---|
| 4,188,295 | 2/1980 | Burnett | 210/206 |
| 4,691,732 | 9/1987 | Johnson et al. | 422/264 |
| 4,908,190 | 3/1990 | Maglio et al. | 422/264 |
| 5,053,206 | 10/1991 | Maglio et al. | 422/264 |
| 5,076,315 | 12/1991 | King | 422/264 |

*Primary Examiner*—Peter Hruskoci
*Assistant Examiner*—Robert James Popovics
*Attorney, Agent, or Firm*—Philip D. Junkins

[57] ABSTRACT

An automatic swimming pool chlorinator having a submersible canister for receiving and containing chlorine tablets or sticks. The canister, at its upper end, is provided with a separable lid which includes:

a principal water flow conduit through which pool water is recirculated by suction to the pool's water filter and heater system or returned to the pool via a water return line;

a multiplicity of small ports for admitting relatively small quantities of pool water to the canister to dissolve the chlorine therein over a period of time;

a chlorinated water flow channel leading from the canister to the principal water flow conduit and through which chlorinated pool water is aspirated from the canister, and is mixed with, the flow of recirculated pool water in the principal water flow conduit; and a water flow controller located within the chlorinated water flow channel to control the amount of chlorinated water aspirated from the canister and through such channel by the pool water being recirculated through the principal water flow conduit to the pool's filter and heater system.

The chlorinator may be mounted between sections of the water suction hose line leading from a pool cleaner unit to a pool skimmer. Alternatively, the chlorinator may be mounted at one end of its principal water flow conduit directly to a water recirculation return line at the side of the pool.

8 Claims, 1 Drawing Sheet

AUTOMATIC SWIMMING POOL CHLORINATOR

BACKGROUND OF THE INVENTION

The present invention relates to swimming pool chlorine feeders. More particularly, the invention relates to automatic swimming pool chlorinators having a chlorine chamber containing and holding chlorine tablets, sticks or powder and through which pool water is circulated under controlled flow conditions to slow dissolve such chlorine materials and chlorinate the pool water.

Typical present-day automatic swimming pool chlorinators are installed in the water circulation through the pool's filter and water heater system outside of the direct environment of the swimming pool. Such automatic devices are commonly referred to as "in-line" chlorine feeders or chlorinators. Alternatively, known pool automatic chlorinators are installed in by-pass water circulation lines leading from the water line leading to the inlet side of the pool's filter and water heater system to the water line leading from the outlet side of such systems. These automatic chlorinators are commonly referred to as "off-line" chlorine feeders or chlorinators.

It is an object of the present invention to provide an automatic swimming pool chlorinator of simplified construction which is mounted in the flexible water suction hose used for automatic pool cleaners.

It is a further object of the invention to provide an automatic swimming pool chlorinator which is mounted in the flexible water suction hose of an automatic pool cleaner which is connected through the pool's skimmer to the water recirculation system of the pool with the chlorinator floating on or at the pool's water surface for easy access.

It is a still further object of the invention to provide an automatic swimming pool chlorinator of simplified construction which can be mounted to a water circulation return line at the side of a pool.

It is another object of the invention to provide an automatic swimming pool canister-type chlorinator with a separable water flow lid which can be mounted via the lid in the flexible water suction hose of an automatic pool cleaner for floatation on or at the pool's water surface or which can be mounted via the lid to a water circulation return line at the side of a pool.

It is yet another object of the invention to provide an automatic swimming pool canister-type chlorinator of simplified construction with a water flow lid which is mountable in the flexible water suction hose of an automatic pool cleaner or to a water circulation return line at the side of a pool and from which the chlorinator canister is easily separable for filling with chlorine tablets or sticks.

Other objects and advantages of the invention will become apparent from the following summary and detailed descriptions of preferred embodiments of the invention taken in connection with the accompanying drawing figures.

SUMMARY OF THE INVENTION

The present invention relates to an automatic swimming pool chlorinator having a chamber or canister for receiving and containing chlorine tablets or sticks. The canister, at its upper end, is provided with a separable lid which includes:

- a principal water flow conduit through which pool water is recirculated by suction to the pool's water filter and heater system or returned to the pool via a water return line;
- a multiplicity of small holes or ports for admitting relatively small quantities of pool water to the canister to dissolve the chlorine material therein over a period of time;
- a chlorinated water flow channel leading from the canister to the principal water flow conduit and through which chlorinated pool water is aspirated from the canister by, and is mixed with, the flow of recirculated pool water in such principal water flow conduit; and
- water flow control means located within the chlorinated water flow channel to control the amount of chlorinated water aspirated from the canister through such channel by the pool water being recirculated through the principal water flow conduit to the pool's filter and heater system.

In accordance with the present invention, the canister is preferably of single molded plastic construction and includes threads at its upper end for attachment to the lid of the chlorinator unit. The canister lid is likewise preferably of single molded plastic construction. The principal water flow conduit, located in the upper portion of the canister lid, is provided at one end with a female connector for receiving the male connector end of a water recirculating hose leading to a water suction type pool cleaner. The principal water flow conduit of the canister lid at its other end is provided with a male connector for connection to a relatively short water recirculation hose section leading through the pool's skimmer to the pool's filter and heater system. Alternatively, the principal water flow conduit (at either end) may be mounted directly to a water recirculation return line at the side of the pool with the recirculated pool water flowing through the water flow conduit and being discharged therefrom into the pool.

The chlorinated water flow channel of the chlorinator lid structure is formed within a neck portion of such structure which mounts the upper principal water flow conduit to the lower canister closure portion thereof. The lower canister closure portion of the lid structure includes at its rim threads which mate with the threads at the upper end of the canister to removably attach the lid structure thereto. The multiplicity of small holes or ports for admitting relatively small quantities of pool water to the canister are located in the canister closure portion of the lid structure outside of the neck portion of the lid structure. The water flow control means within the chlorinated water flow channel of the neck portion of the lid structure may comprise a thumb-and-finger set adjustment screw which extends through the neck portion of the lid structure and into such flow channel to adjustably restrict the channel's effective cross sectional area.

Through the above described chlorinator canister and lid structure, in accordance with the present invention, a relatively small quantity of pool water is circulated through the canister under controlled flow conditions, dissolves chlorine from the chlorine tablets or sticks contained within the canister, and is united by aspirating action (effected by the chlorinator lid structure) with a main flow of recirculating pool water for effectively chlorinating the pool water at desired adjustable chlorine levels. The canister part of the chlorinator can be readily removed from the lid structure, by unscrewing it therefrom, for periodic refilling with chlorine tablets or sticks.

Where the chlorinator of the invention is to be mounted between sections of the water suction hose line leading from a pool cleaner unit to a pool skimmer, float rings are applied to and about the hose sections proximate the male and female hose connectors, and are thereby located proximate the respective female connector end (water inlet) and male connector end (water outlet) of the principal water flow conduit of the canister lid of the chlorinator. The float rings (preferably formed of styrofoam, polyethylene foam or like buoyant material) assure that the chlorinator floats near or at the pool's water surface for the purposes of: retrieval of the chlorinator for loading the canister with solid chlorine materials; inspection of the small water inlet holes or ports in the canister lid of the chlorinator and removing debris therefrom; and maintaining the chlorinator out of interference with the movement of the connected pool cleaner. Where the chlorinator of the invention is to be mounted at one end of the principal water flow conduit of the lid structure directly to a water recirculation return line at the side of the pool, it may be necessary to install a transition pipe fitting to connect the end of the conduit to the pool-side water return line.

BRIEF DESCRIPTION OF THE DRAWING FIGURES

FIG. 1 is a partial cross sectional view of a swimming pool showing the automatic pool chlorinator of the present invention mounted in flotation orientation in the water suction hose line of a vacuum-type pool cleaner;

FIG. 2 is a cross sectional side view of the automatic pool chlorinator of the invention showing its connection to sections of a water suction hose line (phantom outline) and showing in phantom outline floatation rings associated with such hose line sections; and FIG. 3 is a side view of the automatic swimming pool chlorinator of the invention mounted directly to a water return line of a swimming pool.

DETAILED DESCRIPTION OF THE INVENTION

Figure 1:
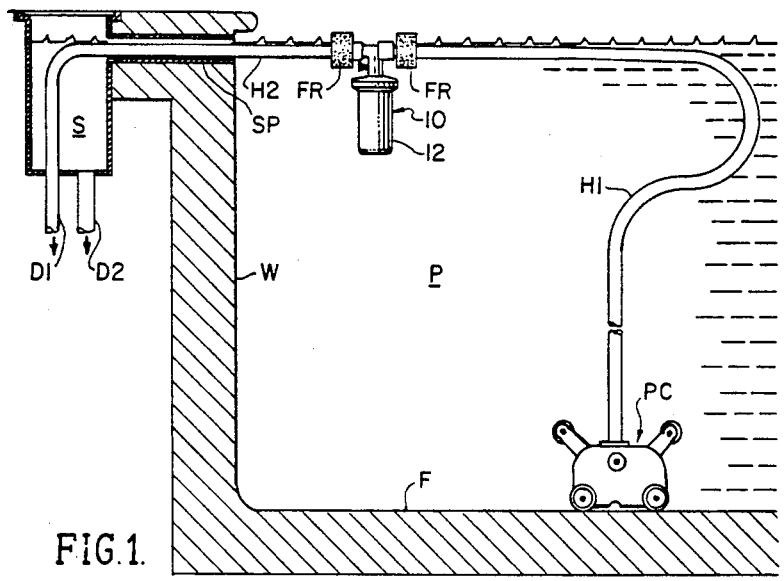

Referring now to the drawing figures there is shown in FIG. 1 a partial cross sectional representation of a swimming pool P including the pool floor F and a pool wall W. Located on the pool floor F is a vacuum-type pool cleaner PC which would normally be interconnected to the pool's water recirculation system (including a suction pump, water filter and water heater —not shown) via a flexible water suction hose leading to the pool's skimmer port SP and skimmer S. In accordance with a principal embodiment of the present invention the pool cleaner PC is interconnected to the water inlet side of the automatic chlorinator 10 of the invention via flexible hose section H1 with the water outlet side of the chlorinator interconnected to flexible hose section H2. The hose section H2 passes through the skimmer port SP and skimmer S for interconnection with pipe D1 and the pool's water recirculation system (not show). In typical fashion the skimmer S is drained through pipe D2 which is also interconnected to the water recirculation system.

Figure 2:
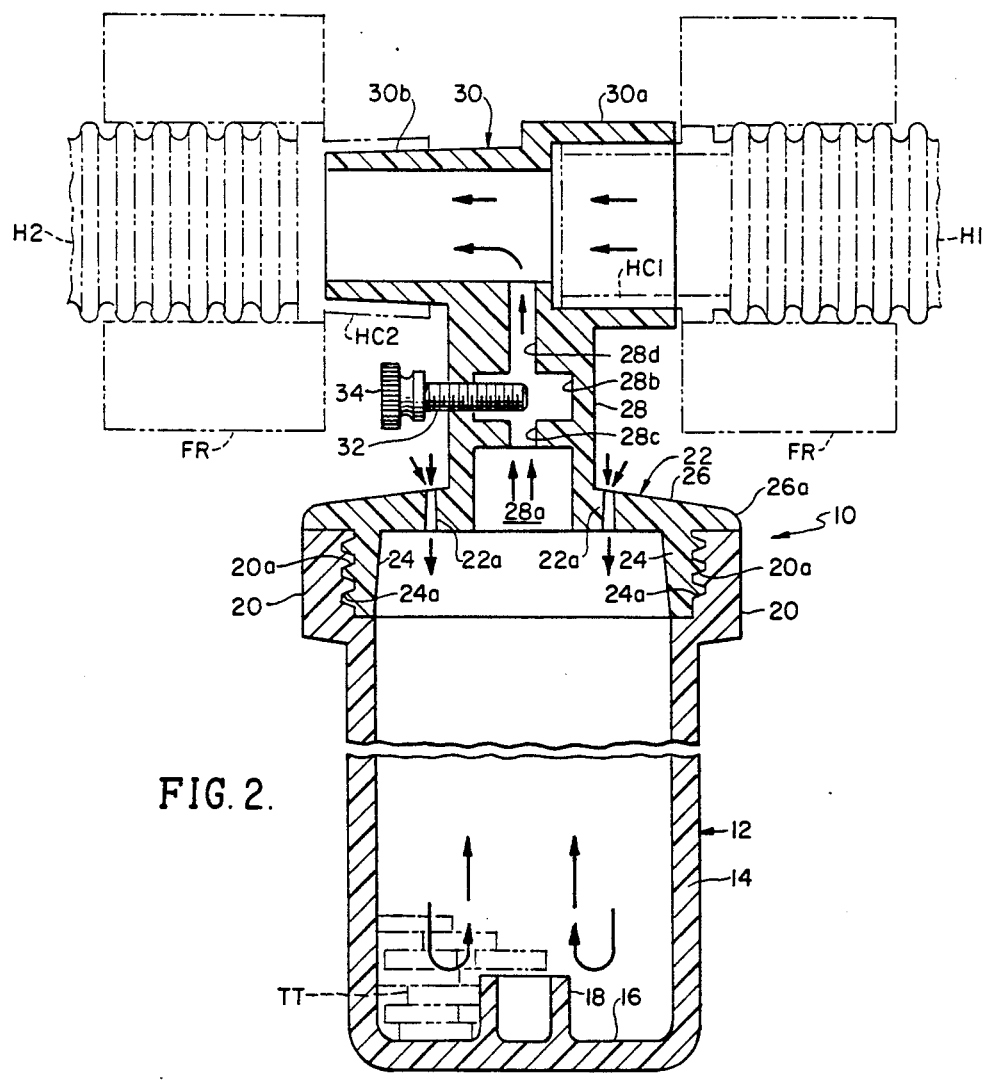

The automatic chlorinator 10, as shown in FIG. 1, is floatation supported at or near the surface of the pool by float rings FR which surround the connector ends of the hose sections H1 and H2. The detailed construction of the chlorinator 10 of the present invention is illustrated in FIG. 2 wherein the principal components of the chlorinator are a chamber or canister 12 for receiving and containing chlorine tablets or sticks and a lid structure 22. The lid structure includes a canister cover portion 26, an upwardly extending neck portion 28 defining a chlorinated water flow channel in water flow communication (through the cover portion) with the canister, and an upper principal water flow conduit 30 for receiving pool water to be recirculated to the pool's external water recirculation system and chlorinated water from the canister via the flow channel within the neck portion 28.

The chlorine chamber or canister 12 is preferably of one piece molded plastic structure and includes annular side wall 14 and base wall 16. The base wall 16 may have projecting upwardly therefrom, within the canister, a small central annulus 18 to assist in effecting random stacking of the chlorine tablets or sticks contained within the canister. Preferably, the chlorine tablets or sticks are formed of trichlor slow dissolving chlorine material and tablet forms TT of such material are illustrated in dashed outline in FIG. 2. The upper open end of the canister 12 incudes an annular rim portion 20 which bears an internal screw thread 20a.

The lid structure 22 of the automatic chlorinator 10 includes, as previously indicated, a canister cover portion 26 from which depends an annular rib 24 which bears on its outer surface screw thread 24a for threaded sealing engagement with the internal screw thread 20a of the upper annular rim portion 20 of the chlorine canister 12. As shown in FIG. 2, the canister cover portion 26 of the lid structure 22 has an annular outer portion 26a which overlaps the upper end of the canister rim portion 20 to assist in sealing the lid structure to the canister when they are threaded to one-another. Also, as previously indicated, there extends upwardly from the canister cover portion 26 of the lid structure 22 a neck portion 28 defining a chlorinated water flow channel which is in water flow communication (through the cover portion 26) with the canister 12. This flow channel within the neck portion 28 is comprised (in flow sequence) of entry chamber 28a, orifice 28c, flow control chamber 28b, and outlet passage 28d leading to the upper principal water flow conduit 30 of the lid structure 22.

The principal water flow conduit 30 of the lid structure 22, through which pool water flows during its recirculation to the pool's external water recirculation system, is comprised of a water inlet conduit portion 30a and a water outlet conduit portion 30b. As shown in FIG. 2 the inlet conduit portion 30a of conduit 30 forms a female connector for attachment of the male connector end of a corrugated-type flexible water circulation hose. In such figure hose section H1 and its male hose connector HC1 are shown in dashed outline. Also in such figure the outlet conduit portion 30b of conduit 30 forms a male connector for attachment of the female connector end of a flexible water circulation hose section H2 (also of corrugated-type construction). The hose section H2 and its female hose connector are shown dashed outline. Float rings FR (serving previously described purpose for the chlorinator) are shown in FIG. 2 in dashed outline as surrounding the terminal end portion of each of the hose sections H1 and H2.

Referring to the canister cover portion 26 of the chlorinator lid structure 22, there are positioned annularly around the cover portion (outside of the neck portion 28 of the lid structure) a multiplicity of relatively small water inlet ports 22a. A limited amount of pool water is permitted to be drawn into the canister 12 through such ports for circulation therein and contact with the chlorine tablets or sticks contained within the canister to dissolve the chlorine of such tablets or sticks. There are at least 2, and preferably 4 or more inlet ports (having a diameter range of from about 1/32 inch to about ⅛ inch) placed at equally spaced annular points around the cover portion 26. The flow of pool water through ports 22a and into the chlorine canister 12 is controlled by the flow amount of chlorinated water out of the canister through the flow channel within the neck portion 28 of the lid structure 22. As previously indicated, such flow channel is comprised of entry chamber 28a, orifice 28c, flow control chamber 28b, and outlet passage 28d leading to the upper principal water flow conduit 30. The principal stream of recirculating pool water flowing by suction force through conduit 30 causes an aspirating effect across the open upper end of the passage 28d thereby drawing chlorinated water through such passage from the remaining sections of the flow channel within the neck portion 28 of the lid structure 22 and out of the canister 12. The chlorinated water leaving passage 28d is admixed with the principal stream of recirculating pool water flowing through conduit 30. The amount of chlorinated water aspirated from the chlorine canister 12 of the chlorinator 10 is controlled by a thumb-and-finger set adjustment screw 32 which extends through the wall of the neck portion 28 of the lid structure and projects into the flow control chamber 28b to adjustably restrict the flow channel's effective cross sectional area. The outer end of the adjustment screw may include a knurled head portion 34 for easy thumb-and-finger grip turning.

Installation of the automatic swimming pool chlorinator of the present invention, as a floating in-line unit in association with a pool cleaner, is easily accomplished. With the suction pump of the pool's water recirculation system turned off so that no water is flowing through the flexible hose leading from the pool cleaner to the skimmer port, the hose sections (H1 and H2 in FIG. 2) closest to the skimmer are separated. Float rings FR are positioned over the separated hose ends and the male connector end HC1 of hose section H1 is connected into the water inlet conduit portion 30a of the water flow conduit 30 and the hose section H2 connected onto the water outlet conduit portion 30b of conduit 30. The chlorine canister 12 is filled with chlorine tablets or stick (preferably 1 inch trichlor tablets TT) and the canister is screwed onto the lid structure 22 of the chlorinator 10. The chlorinator 10 is placed in the pool in floatation orientation near the skimmer and the water suction pump (not shown in the drawing figures) is turned on.

With the water suction pump of the pool's water recirculation system in operation pool water is draw through the pool cleaner PC and hose section H1 and through the principal water flow conduit 30 of the chlorinator 10. Small quantities of pool water flow into the chlorinator canister 12 through ports 22a in the canister cover section 26 of the lid structure 22 and contact the tablets TT to dissolve chlorine therefrom. A limited and controlled quantity of the chlorinated water within the canister 12 is drawn through the flow channel within the neck portion 28 of the lid structure 22 of the chlorinator 10 by the aspirating effect on passage 28d of the neck portion 28 of the stream of pool water flowing through the principal water conduit 30. The chlorinated water leaving the passage 28a mixes with the stream of pool water flowing in the water conduit 30 during its flow through the pool's recirculation system (pump, filter and heater–not shown) and the mixed stream is returned to the pool. The chlorine level (concentration) in the pool water is initially checked on a daily basis. If the chlorine level needs to be lowered the adjustment screw 32 in the neck portion 28 of the lid structure 22 is turned clockwise to reduce the effective water flow area within the flow control chamber 28b of the lid structure. If the chlorine level needs to be raised to increase the sanitizing effect of chlorine in the pool water, the adjustment screw 32 is turned in a counter-clockwise direction (withdraws the screw) to increase the effective water flow area within the flow control chamber thereby allowing an increased quantity of the concentrated chlorinated water to join and mix with the pool water stream flowing through the principal water flow conduit 30 of the lid structure.

The chlorinator of the present invention may be constructed to hold in its canister portion from about 4 pounds of solid chlorine materials to about 8 to 10 pounds of such materials. As previously indicated, the preferred solid form of chlorinating material is slow dissolving trichlor tablets. Such tablets are commonly supplied in 1 inch diameter size. Alternatively, slow dissolving chlorine sticks may also be used.

Figure 3:
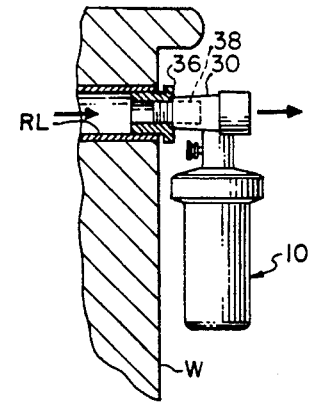

Referring now to FIG. 3 there is shown the automatic chlorinator 10 of the present invention mounted in permanent fashion to a pool water return line RL in the side wall W of a swimming pool. The return line is provided with an appropriate pipe transition fitting 36. The water conduit portion 30b of the principal water flow conduit 30 of the lid structure of the chlorinator is provided with an appropriate fitting 38 which permits removable threaded attachment of the chlorinator lid section to the return line. The canister portion of the chlorinator may be unscrewed from its lid portion for filing and refilling with chlorine tablets or sticks. Controlled quantities of chlorinated water from within the canister of the chlorinator 10 are admixed with recirculated pool water leaving the return line RL for discharge into the pool.

In the specification and drawing figures there has been set forth a preferred embodiment of the automatic swimming pool chlorinator of the present invention. Although specific terms have been employed in describing the invention, they are used in a generic and descriptive sense only and not for purposes of limitation, the scope of the invention being defined in the following claims.

What is claimed is:

1. A swimming pool chlorinator for automatic chlorination of the water of a swimming pool comprising:
   a) a submersible canister, with an open upper end, for receiving and containing slow dissolving solid chlorine materials; and
   b) a lid structure for sealably closing the open upper end of said canister and for controlling the rate of chlorination of pool water flowing therethrough, said lid structure including,
      i) a principal water flow conduit through which pool water to be chlorinated enters at one end of said conduit, passes through said conduit, and exits at the other end of said conduit,
      ii) a canister cover portion with edge means for removably sealing said lid structure to the upper end of said canister, said cover portion having a multiplicity of small ports for admitting pool water to said canister for the slow dissolving of solid chlorine materials therein and thereby the formation of concentrated chlorinated water, iii) a neck portion extending upwardly from said cover portion and including a wall defining a water flow channel, said channel at its lower end being in communication through said cover portion with said canister for receiving chlorinated water therefrom, and said neck portion at its upper end supporting said principal water flow conduit with the water flow channel of said neck portion at its upper end being in communication with said conduit whereby pool water flowing through the principal water flow conduit creates an aspirating flow effect on the chlorinated water in said channel drawing said chlorinated water into said conduit for admixture with pool water to be chlorinated, and iv) water flow control means located within the water flow channel of said neck portion to control the amount of chlorinated water drawn into the principal water flow conduit.

2. A swimming pool chlorinator for the automatic chlorination of the water of a swimming pool as claimed in claim 1 wherein the open upper end of the canister includes an annular rim portion which bears screw threads and the canister cover portion of said lid structure includes an annular rim portion which bears screw threads which mate with the screw threads of said canister to removably seal said lid structure to said canister.

3. A swimming pool chlorinator for the automatic chlorination of the water of a swimming pool as claimed in claim 1 wherein the multiplicity of small ports in the cover portion of the lid structure of said chlorinator for admitting pool water to said canister are arranged annularly about said cover portion outside of the neck portion of said lid structure in equally spaced relationship from one-another.

4. A swimming pool chlorinator for the automatic chlorination of the water of a swimming pool as claimed in claim 1 wherein the water flow control means located within the water flow channel of the neck portion of the lid structure of said chlorinator is comprised of a thumb-and-finger set adjustment screw which extends through the wall of the neck portion of said lid structure and projects into the water flow channel of said neck portion to adjustably restrict the effective cross sectional area of said channel.

5. A swimming pool chlorinator for the automatic chlorination of the water of a swimming pool as claimed in claim 1 wherein one end of the principal water flow conduit of the lid structure of said chlorinator is connected by hose means to a vacuum-type pool cleaner and the other end of said conduit is connected by hose means to a suction pump.

6. A swimming pool chlorinator for the automatic chlorination of the water of a swimming pool as claimed in claim 5 wherein the hose means connected to a vacuum-type pool cleaner at its end proximate the principal water flow conduit of the lid structure of said chlorinator is provided with floatation means and the hose means connected to the end proximate the other end of said conduit is provided with floatation means whereby said chlorinator and connected hose means float near or at the water surface of the swimming pool.

7. A swimming pool chlorinator for the automatic chlorination of the water of a swimming pool as claimed in claim 1 wherein one end of the principal water flow conduit of the lid structure of said chlorinator is connected to a water return line of the swimming pool.

8. A swimming pool chlorinator for the automatic chlorination of the water of a swimming pool comprising:

a) a water submersible canister of molded plastic construction having an annular side wall, a bottom wall and an open upper end, said canister defining a chlorination chamber for receiving and holding slow dissolving solid chlorine materials for the chlorination of water; and b) a molded plastic lid structure for sealably closing the open upper end of said canister and the chlorination chamber therein and for controlling the rate of chlorination of pool water flowing therethrough, said lid structure including, i) a principal water flow conduit including an inlet end and an outlet end and through which pool water to be chlorinated is drawn into said inlet end and through said conduit by a suction pump in water flow communication with said outlet end, ii) a canister cover portion with edge means for removably sealing said lid structure to the open upper end of said canister, said cover portion having a multiplicity of small ports for admitting pool water to said canister for the slow dissolving of solid chlorine materials therein and thereby the formation of concentrated chlorinated water, iii) a neck portion extending upwardly from said cover portion, said neck portion including a side wall defining a water flow channel, said channel at its lower end being in water flow communication through a central opening in said cover portion with the chlorination chamber of said canister for receiving concentrated chlorinated water therefrom, said neck portion at its upper end supporting said principal water flow conduit, and said channel at its upper end being in water flow communication with said conduit whereby pool water flowing through the principal water flow conduit creates an aspirating flow effect on the concentrated chlorinated water in said channel drawing said chlorinated water into said conduit for admixture with the pool water flowing therethrough and chlorination thereof, and iv) water flow control means located within the water flow channel of said neck portion to control the amount of concentrated chlorinated water drawn therefrom and into the principal water flow conduit whereby the chlorine level in the pool water is maintained at a safe level.

* * * * *